Sept. 25, 1945.   A. H. CANDEE ET AL   2,385,330
MACHINE FOR CUTTING GEARS
Filed March 23, 1944   2 Sheets-Sheet 1
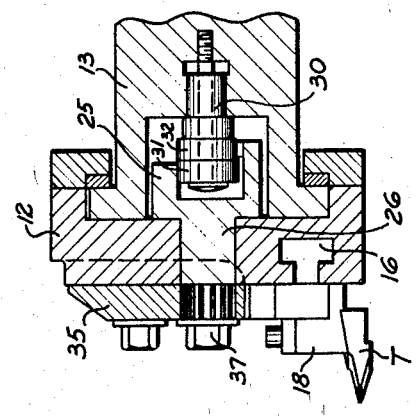
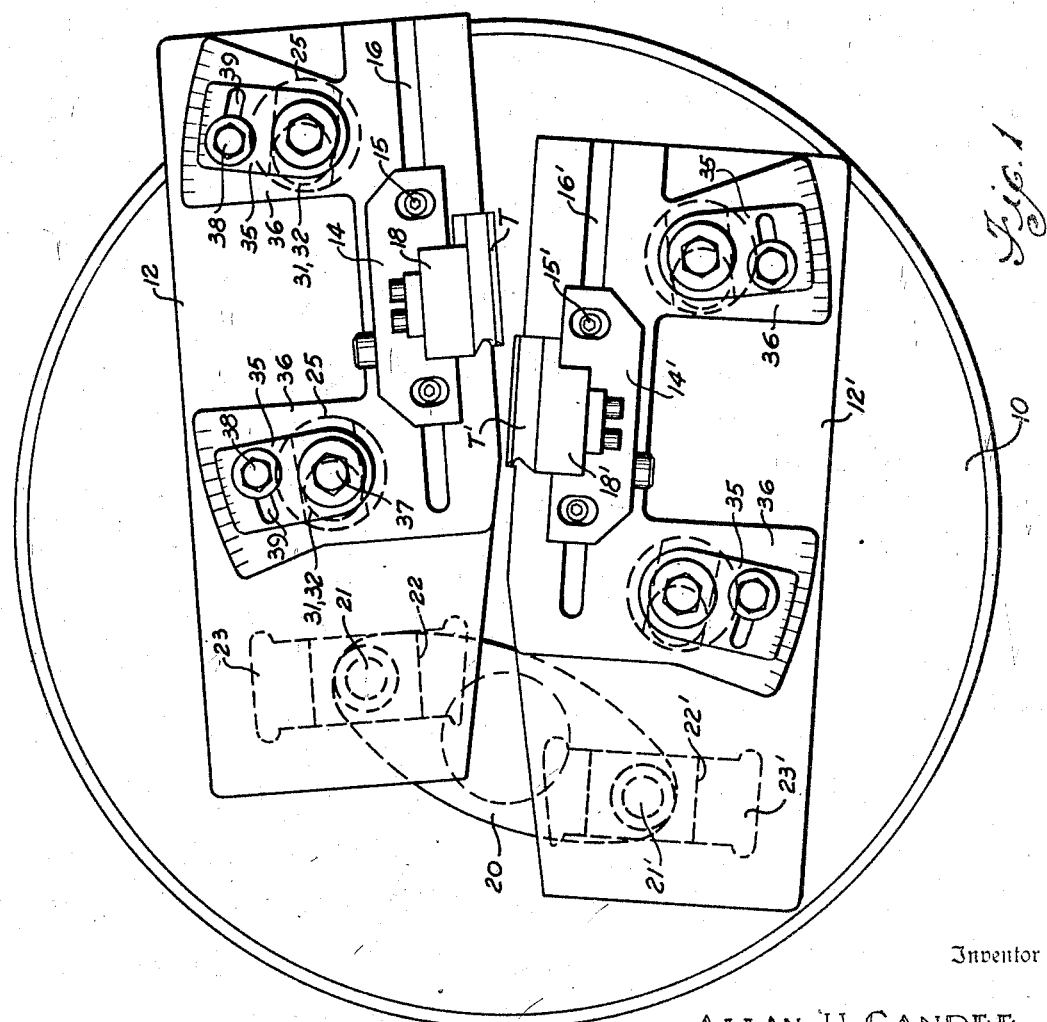
Inventor
ALLAN H. CANDEE
LEONARD O. CARLSEN
By
Attorney Sept. 25, 1945.  A. H. CANDEE ET AL  2,385,330
MACHINE FOR CUTTING GEARS
Filed March 23, 1944   2 Sheets-Sheet 2
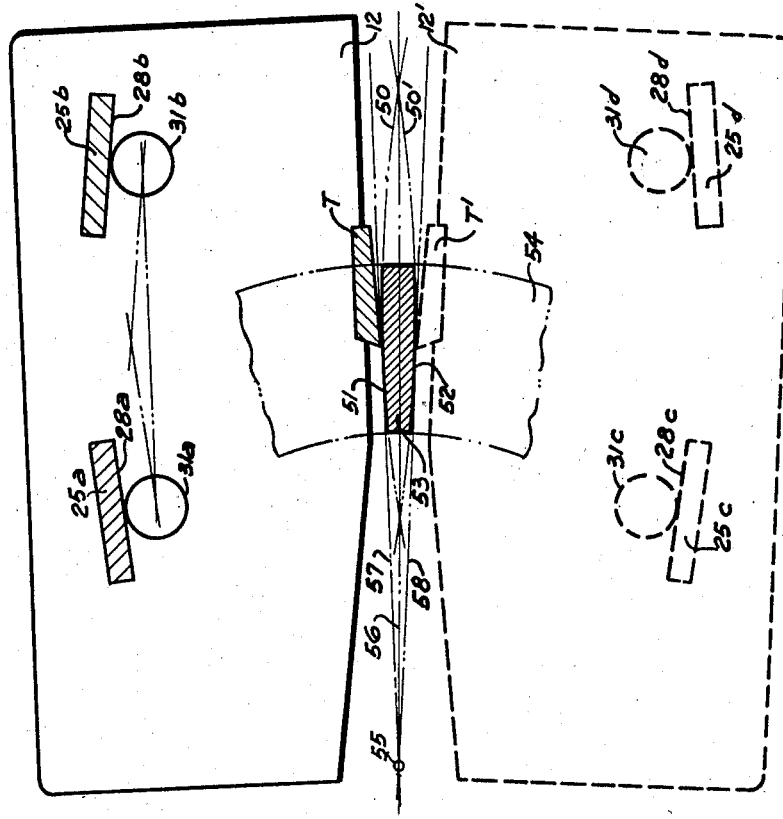
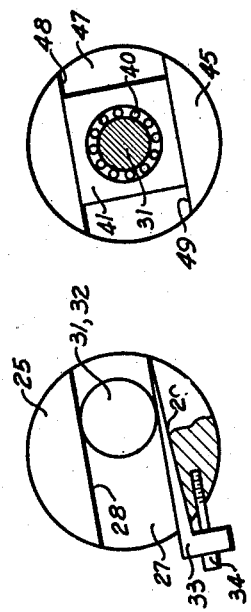
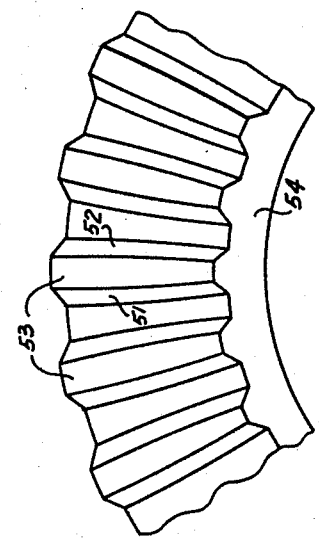
Inventor
ALLAN H. CANDEE
By LEONARD O. CARLSEN
Attorney Patented Sept. 25, 1945

2,385,330

UNITED STATES PATENT OFFICE

2,385,330

MACHINE FOR CUTTING GEARS

Allan H. Candee and Leonard O. Carlsen, Rochester, N. Y., assignors to Gleason Works, Rochester, N. Y., a corporation of New York Application March 23, 1944, Serial No. 527,818

4 Claims. (Cl. 90—6)

The present invention relates to the production of gears and particularly to the production of bevel gears having radially disposed teeth or, more broadly, teeth that extend in a generally straight-line direction.

For many years it has been common practice to cut spiral bevel and hypoid gears so that the meshing tooth surfaces of mating gears have less than full length contact or tooth bearing. Gears so made will run quietly together even though displaced somewhat from theoretically correct running position. Such gears are readily able to accommodate themselves to the variations in mountings and loads that are encountered in use. A method has been known for cutting straight toothed bevel gears with localized tooth bearing but this method requires considerable mathematical calculation, and has not gone into general use. Recently, machines have been developed on which straight bevel gears may be cut with localized tooth bearing by varying the depth of cut of the cutting tools as they move in rectilinearly converging paths across the face of the gear blank, the tools being constrained to cut deeper at the ends of a tooth space than at the center thereof. This method is very simple and practical, but it does require that the tooth spaces of the gear be cut with convex bottoms and they do not have the natural, normal taper. Moreover, in these machines, the amount of crowning or localization of tooth bearing is controlled by a cam which varies the depth of cut of the tool as it moves across the face of the blank, and to vary the amount of crowning or localization of bearing, it is necessary to change cams.

A primary object of the present invention is to provide a method and machine for cutting straight bevel gears with a longitudinally crowned or localized tooth shape which will permit cutting the tooth spaces with straight bottoms and with proper taper in depth from end to end.

A further object of the invention is to provide a method and machine for cutting straight bevel gears with localized tooth bearing, in which the localization of bearing may be obtained by control of the lengthwise movement of the cutting tools rather than by control of the depthwise movement thereof.

Another object of the invention is to provide a method and machine for cutting straight bevel gears with localized tooth bearing, in which the crowning of the teeth may be obtained by moving the cutting tools in longitudinally curved paths to produce side tooth surfaces on both sides of the gear teeth which are longitudinally convex from end to end.

A still further object of the invention is to provide a machine for producing straight bevel gears of the character described in which any desired amount of localization of tooth bearing may be obtained by simple adjustment of control members themselves, without requiring substitution of different control members.

Other objects of the invention will be apparent hereinafter from the specification and from the recital of the appended claims.

In the drawings:

Fig. 1 is a front elevation of the tool end of a bevel-gear-cutting machine built according to a preferred embodiment of this invention;

Fig. 2 is a fragmentary transverse sectional view through one of the tool slides of the machine and the ram on which the slide is reciprocable;

Fig. 3 is a detail sectional view taken at right angles to Fig. 2 and showing one of the guide blocks and rollers for controlling the lengthwise movement of the tool slide;

Fig. 4 is a corresponding view, showing an alternative construction;

Fig. 5 is a diagrammatic view, illustrating the cutting of a tooth of a gear according to the process of the present invention; and Fig. 6 is a fragmentary plan view of a straight bevel gear having longitudinally crowned teeth, such as may be cut by the process and on a machine of the present invention.

In the drawings, the invention has been disclosed in the form of an improvement on the machine of the Carlsen Patent No. 2,101,237 of December 7, 1937. In fact, except for the differences in the tool mechanism hereinafter described, the machine of the present invention may be the same in construction and operation as the machine disclosed in the Carlsen patent.

10 denotes the cradle of the machine, while 12 and 12' are the two tool slides. The slides are reciprocable on rams 13, which, like the rams 25 of the Carlsen patent, are reciprocably mounted in the cradle to move in the direction of the axis of the cradle and at right angles to the directions of movement of the tool slides for the purpose of moving the cutting tools into and out of cutting position at opposite ends of the strokes of the tool slides.

Mounted on the tool slides for adjustment longitudinally of each slide are the tool holders 14 and 14', respectively. These tool holders are secured to the slides, after adjustment, by bolts 15 and 15' that engage in elongated T-slots 16 and 16', respectively, that are formed in the faces of the two slides. Mounted on the tool holders 14 and 14' are the tool blocks 18 and 18', respectively, and to the tool blocks are secured the planing tools T and T', respectively. These tools are of standard construction and are such as are commonly used in the cutting of straight tooth bevel gears.

The tool slides 12 and 12' are adapted to be reciprocated by an oscillatory actuating member 20, which may be driven from a crank or other suitable member in the usual way. This oscillatory actuating member is connected to the upper tool slide 12 by a pin 21 and a block 22. The latter slides in a slot 23 formed in the upper tool slide 12. The actuating member 20 is similarly connected to the lower tool slide 12' by the pin 21', block 22' and slot 23'. As the actuating member is oscillated, then, the tool slides and the tools carried thereby are moved simultaneously in opposite directions.

Mounted in each of the tool slides are a pair of blocks 25. Each block has a stud portion 26 (Fig. 2) by which the block is journaled in the slide 12 or 12' for angular adjustment therein. In the form shown in Fig. 3, each block 25 is formed with a transversely extending slot 27 which provides an upper straight-sided guide surface 28 and a lower straight-sided surface 29. Mounted on the front face of each ram 13 are a pair of studs 30. The studs of each pair are spaced from one another and thread into the faces of the rams 13. Each stud carries a pair of rollers 31 and 32. Each roller 31 is adapted to engage and roll on the upper guide surface 28 of a slot 27 of a block 25, and each roller 32 is adapted to roll on a tapered gib 33 which is interposed between the lower surface 29 of the block and the roller 32 and which is provided to take up wear of the slots. Thus, each roller 31 is held in frictional engagement with the slide 28 of a slot 27. Each taper gib 33 may be adjusted by a screw 34 which threads into the corresponding block 25.

Each of the blocks 25 is adjustable angularly in its tool slide so as to incline the side guide-wall 28 of its slot 27 to the direction of reciprocation of the corresponding tool slide 12 or 12'. For the purpose of making the adjustment accurately, each of the four blocks 25 carries an arm 35 which is graduated at its outer end to read against vernier graduations scribed on the face of a raised or embossed portion 36 of the tool slide. Each arm 35 is secured to its block 25 by a bolt 37 and it has an internally splined bore which engages an externally splined portion of the corresponding stud 26 to hold it securely to the block. Each arm 35 and block 25 is secured in any angularly adjusted position by means of a bolt 38 which passes through an arcuate slot 39 in the arm and which threads into the corresponding tool slide 12 or 12'.

Instead of having the rollers 31 and 32 ride directly on the side walls of the slots 27, the guide blocks may be formed in the manner shown at 45 in Fig. 4. Here the guide block 45 has a guide slot 47 whose upper and lower sides 48 and 49 are straight, and each roller 31 is journaled on anti-friction bearings 40 in a rectangular block 41 which is adapted to slide in a slot 47 of a block 45.

In use, the two blocks 25 or 45 carried by each slide 12 and 12' are adjusted so that their guide surfaces 28 or 48 are inclined at an angle to one another and to the direction of movement of the slide so that they will assume positions such as shown diagrammatically in Fig. 5. The guide blocks are here denoted at 25a, 25b, 25c, and 25d, respectively, and their guide surfaces at 28a, 28b, 28c, and 28d, respectively. The rollers, which ride on the guide surfaces of the several blocks, are denoted at 31a, 31b, 31c, and 31d, respectively. Since only one of the tools T or T' is cutting at a time, the other tool being withdrawn on its return stroke, one of the tool slides and its tool T is shown in full lines in the cutting position while the other tool slide 12' and its tool T is shown in dotted lines in its withdrawn, non-cutting position.

The gear to be cut is denoted at 54 and a tooth thereof is shown at 53. The apex of the gear is at 55 while 56 denotes the longitudinal center line of the tooth extending radially of gear apex 55. The tool slides 12 and 12' are adjusted angularly on the cradle 10 in the accustomed way to incline the slides in accordance with the lengthwise taper which it is desired to produce on the gear teeth and which in the instance shown is determined by the angle between the lines 57 and 58 tangent to opposite sides of the tooth 53 and passing through the gear apex 55. If the pair of guide blocks 25a and 25b or the pair of guide blocks 25c and 25d of either tool slide were positioned parallel to one another and to the direction of movement of slide 12 or 12', the tool slide would move in a straight line, but when the pair of guide blocks are inclined to one another, the guide blocks will have a combined sliding and pivotal movement as they move on the pins 31 in the reciprocation of the tool slides. Hence, the slides 12 and 12' and the tool T and T' carried thereby will move in curved paths as the slides are reciprocated by the actuating member 20. Thus, the tools T and T' will cut along curved paths 50 and 50', respectively and will produce opposite side tooth surfaces 51 and 52, respectively, on gear tooth 53 which are of convex lengthwise shape.

The radii of curvature of the sides 51 and 52 of the gear teeth can be determined according to the known principles of kinematics. In the drawings, the sides 51 and 52 are so curved that they are tangent to the radial lines 57 and 58, respectively, at mean points in the length of opposite sides of the teeth, but the point of tangency of the tooth sides can be located anywhere along the length of the teeth. By varying the angular positions of the guide blocks, the radii of curvature of the tool paths can be changed and, therefore, complete control can be had with the present invention over the amount of lengthwise curvature of the sides of the teeth of a gear. Any desired amount of crowning can be obtained.

Fig. 6 illustrates a straight tooth bevel gear having teeth cut according to this invention. Such a gear may be meshed with a similarly cut gear or with a gear cut in a standard manner and in either case the pair will have a localized tooth bearing.

The invention may be used in cutting gears either with or without generating roll. Moreover, while the invention has been described particularly in connection with a machine for cutting straight bevel gears having radially extending teeth, it will be understood that it also may be applied to the cutting of bevel gears having offset or skew teeth. It will be understood, too, that it is applicable to the cutting of spur gears. This application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. In a machine for producing gears, a support, a slide reciprocably mounted on the support, a pair of spaced straight guide members carried by one of said parts and a pair of rollers carried by the other of said parts, said guide members having their guide surfaces inclined to one another, said rollers being adapted to cooperate, respectively, with the two guide members and being adapted to engage said guide members simultaneously during reciprocation of the slide to impart a curvilinear movement to the slide, a cutting tool carried by the slide, and means for reciprocating the slide to move the cutting tool back and forth across the face of a gear blank.

2. In a machine for producing gears, a support, a slide reciprocably mounted on the support, a pair of guide members carried by one of said parts and a pair of contact members carried by the other of said parts, said guide members being spaced from one another longitudinally of the direction of movement of the slide and being adjustable angularly to incline their guide surfaces to the direction of movement of the slide, said pair of contact members being adapted to engage, respectively, with the two guide members, a cutting tool carried by the slide, and means for reciprocating the slide to move the cutting tool back and forth longitudinally of a tooth of the gear being cut.

3. In a machine for producing gears, a support, a slide reciprocably mounted on the support, a pair of guide members carried by one of said parts and a pair of contact members carried by the other of said parts, said guide members having straight guide surfaces and being spaced from one another longitudinally of the direction of movement of the slide and being adjustable angularly to incline their guide surfaces to the direction of movement of the slide, said pair of contact members being adapted to engage, respectively, with the guide members, a cutting tool carried by the slide, and means for reciprocating the slide to move the cutting tool back and forth longitudinally of a tooth of the gear to be cut, both the guide members and the contact members being offset at one side of the tooth.

4. In a machine for producing gears, a support, a pair of slides reciprocably mounted on the support, a pair of guide members carried by each of said slides and spaced relative to one another longitudinally of the slide, two pairs of rollers carried by the support, one pair of which is adapted to engage and cooperate with one pair of guide members and the other pair of which is adapted to engage and cooperate with the other pair of guide members, the two pairs of rollers being rotatably mounted on fixed centers and one pair of rollers being offset at one side of a tooth of the gear to be cut while the other pair of rollers is offset at the opposite side of said tooth, each of the guide members having a straight guide surface and being adjustable angularly on its slide to incline its straight guide surface to the path of reciprocation of the slide, a cutting tool carried by each slide, and means for reciprocating the two slides to move the cutting tools back and forth longitudinally of the tooth being cut.

ALLAN H. CANDEE.
LEONARD O. CARLSEN.